United States Patent
Yao et al.

(10) Patent No.: US 12,374,898 B2
(45) Date of Patent: Jul. 29, 2025

(54) PHOTOVOLTAIC SYSTEM AND CONTROL METHOD

(71) Applicant: Huawei Digital Power Technologies Co., Ltd., SHENZHEN (CN)

(72) Inventors: Xiaofeng Yao, Shenzhen (CN); Guilei Gu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/441,157

(22) Filed: Feb. 14, 2024

(65) Prior Publication Data

US 2024/0186795 A1 Jun. 6, 2024

Related U.S. Application Data

(63) Continuation of application No. PCT/CN2021/113109, filed on Aug. 17, 2021.

(51) Int. Cl.
*H02J 3/38* (2006.01)
*H02J 3/00* (2006.01)

(52) U.S. Cl.
CPC .............. *H02J 3/381* (2013.01); *H02J 3/001* (2020.01); *H02J 2300/26* (2020.01)

(58) Field of Classification Search
CPC .................................. H02J 3/38; H02J 3/001
See application file for complete search history.

(56) References Cited

U.S. PATENT DOCUMENTS

| 2012/0042588 A1 | 2/2012 | Erickson, Jr. |
| 2018/0233614 A1 | 8/2018 | Dai et al. |

FOREIGN PATENT DOCUMENTS

| CN | 101953060 B | 9/2015 |
| CN | 107104461 A | 8/2017 |
| CN | 107154642 A | 9/2017 |
| WO | 2020254029 A1 | 12/2020 |

*Primary Examiner* — Robert L Deberadinis
(74) *Attorney, Agent, or Firm* — WOMBLE BOND DICKINSON (US) LLP (57) ABSTRACT

The system includes a plurality of first converters, a second converter, an inverter, and a controller. The controller obtains a sum of input voltages of the plurality of first converters connected in series to each other; when the sum of the input voltages of the plurality of first converters is greater than a first voltage, adjusts the output voltage of the first converter, so that the sum of the input voltages of the first converters is less than or equal to the first voltage; and when the sum of the input voltages of the first converters is less than a second voltage, adjusts an output voltage of the second converter, so that the output voltage of the second converter is greater than or equal to the second voltage, and the first converters keep in a state of adjusting the input voltages based on power.

20 Claims, 9 Drawing Sheets

PHOTOVOLTAIC SYSTEM AND CONTROL METHOD

CROSS-REFERENCE TO RELATED APPLICATIONS

This application is a continuation of International Application No. PCT/CN2021/113109, filed on Aug. 17, 2021, the disclosure of which is hereby incorporated by reference in its entirety.

TECHNICAL FIELD

This application relates to electronic power technologies, and in particular, to a photovoltaic system and a control method.

BACKGROUND

Photovoltaic power generation is to convert, by using a converter, a direct current generated by a photovoltaic module into an alternating current that meets a requirement of a power grid and then connect the alternating current to a public power grid. A conventional photovoltaic system usually includes devices such as a photovoltaic module and a converter. Because an output voltage that can be generated by a single photovoltaic module is usually low, to enable the photovoltaic system to run normally, a plurality of photovoltaic modules are usually first connected in series to form a photovoltaic string, and then the photovoltaic string is connected to the converter.

Generally, a range of the input voltage required by the converter is limited, and therefore a quantity of photovoltaic modules connected in series in the photovoltaic string cannot be excessively large. If the quantity of photovoltaic modules connected in series in the photovoltaic string is excessively large, an input voltage limit of the converter may be exceeded, and the converter may be damaged. In addition, for each photovoltaic module, an open-circuit voltage of the photovoltaic module is related to an environment temperature of the photovoltaic module during running. A lower temperature indicates a higher open-circuit voltage of the photovoltaic module. Therefore, during design of the photovoltaic system, a lowest temperature of an installation environment needs to be considered, to estimate a maximum voltage that may be output by the photovoltaic string. A maximum voltage that may be output by each photovoltaic string is limited to not exceed the input voltage limit value of the converter to determine a maximum quantity of photovoltaic modules connected to each of the photovoltaic strings, which ensures that the converter is not damaged.

In addition, different photovoltaic modules located in a same photovoltaic string may have different running environments (for example, parameters such as orientations, illumination, temperature rises, and shading of the photovoltaic modules may be different), or parameters of the photovoltaic modules may be different (for example, types of the photovoltaic modules are different, aging degrees are different, or some photovoltaic modules have defects). As a result, different photovoltaic modules output different currents, and a photovoltaic module with a low output current may limit an output current of the entire photovoltaic string, which affects an energy yield of the entire photovoltaic system.

In the existing photovoltaic system, a photovoltaic module configuration in the photovoltaic string is limited by the input voltage limit of the converter. As a result, a quantity of photovoltaic modules that are allowed to be connected in series in a single photovoltaic string is small. In addition, a current matching loss caused by a difference between the photovoltaic modules cannot be overcome, which affects an energy yield of the photovoltaic system. In view of this, how to flexibly configure a quantity of photovoltaic modules in each photovoltaic string and improve an overall energy yield of a photovoltaic system is an urgent problem to be resolved by one of ordinary skilled in the art.

SUMMARY

This application provides a photovoltaic system and a control method, to flexibly configure a quantity of photovoltaic modules in a photovoltaic string, so that a photovoltaic module configuration in the photovoltaic string is not limited by an input voltage limit of a lower-level circuit, thereby increasing an overall energy yield of the photovoltaic system.

According to a first aspect, this application provides a photovoltaic system, and the photovoltaic system includes a plurality of photovoltaic modules, a plurality of first converters, a second converter, an inverter, and a controller. Output ends of the plurality of photovoltaic modules are connected and then connected to an input end of one first converter, output ends of the plurality of first converters are connected in series and then connected to an input end of the second converter, and an output end of the second converter is connected to the inverter. The photovoltaic module is configured to convert absorbed light energy into electric energy. The first converter is configured to adjust an output voltage and an output current of a corresponding photovoltaic module to perform maximum power point tracking on the module, or is configured to adjust an output voltage and an output current of the first converter to meet a system requirement. The output ends of the plurality of first converters are connected in series and then connected to the input end of the second converter, and the output end of the second converter is connected to the inverter. The inverter is configured to invert a direct current to an alternating current and transmit the alternating current to a power grid or a load. The controller is configured to: obtain a sum of input voltages of the plurality of first converters connected in series to each other; when the sum of the input voltages of the plurality of first converters is greater than a first voltage, adjust an output voltage of one or more first converters, so that the sum of the input voltages of the plurality of first converters is less than or equal to the first voltage; and when the sum of the input voltages of the plurality of first converters is less than a second voltage, adjust an output voltage of the second converter, so that the output voltage of the second converter is greater than or equal to the second voltage, and the plurality of first converters keep in a state of adjusting the input voltages based on power, where the first voltage is greater than the second voltage.

The controller in the photovoltaic system provided in this application is used to adjust the output voltage of the first converter connected to one or more photovoltaic modules. When a sum of input voltages of a plurality of first converters in a same string is greater than the first voltage, an output voltage of one or more first converters is adjusted, so that the sum of the voltages output by the plurality of first converters connected in series to each other is less than the first voltage, thereby ensuring that the photovoltaic system can run normally and protecting a lower-level device. However, when the sum of the input voltages of the plurality of first converters is less than the second voltage, the output voltage of the second converter is adjusted, so that the output voltage of the second converter is greater than or equal to the second voltage, thereby ensuring that a sum of output voltages of the plurality of first converters meets a grid-connected voltage and/or grid-connected power. Based on the foregoing structure, a voltage finally output by the second converter may be controlled to be in a proper interval. Even if photovoltaic module configurations are different, a lower-level voltage can still run in a preset interval, so as to adapt to a photovoltaic module configuration in a large range. In addition, when the sum of the input voltages of the plurality of first converters is not greater than the first voltage and the sum of the input voltages of the plurality of first converters is not less than the second voltage, the plurality of first converters may further keep in a state of adjusting the input voltages based on power, which can increase an overall energy yield of the photovoltaic system in addition to increasing a quantity of photovoltaic modules connected to the photovoltaic system.

In an embodiment, the inverter is configured to connect a power grid or connect to a load, the first voltage is an upper limit value of a voltage allowed to be input to the inverter, and the second voltage is a peak value of a voltage of the power grid or a minimum value of a voltage required by the load. Therefore, according to the foregoing method, the controller may dynamically adjust values of the first voltage and the second voltage based on the upper limit value of the voltage allowed to be input to the inverter, the peak value of the voltage of the power grid, or the minimum value of the voltage required by the load.

In an embodiment, the controller is configured to: determine, based on the first voltage, a first output voltage threshold corresponding to the plurality of first converters; and control the plurality of first converters, so that output voltages of the plurality of first converters do not exceed the corresponding first output voltage threshold. An adjusted output voltage of any first converter is less than or equal to the first output voltage threshold corresponding to the first converter, so that the sum of the voltages output by the plurality of first converters connected in series to each other is less than the first voltage.

To enable more photovoltaic modules to be connected to the photovoltaic system, and enable a total output voltage range of a plurality of first converters in a same string to be independent of a quantity of actually connected photovoltaic modules and a parameter of the photovoltaic module, in an embodiment, the controller is configured to: the first output voltage threshold is a product of the input voltage of the first converter and a target threshold voltage, where the target threshold voltage is the first voltage/the sum of the input voltages of the plurality of first converters. For example, a product of the input voltage of the first converter and the target threshold voltage ratio may be directly used as the first output voltage threshold, or a first threshold voltage less than or equal to the product is set by using another function relationship. The first output voltage threshold may alternatively be the first voltage/N, where N is a total quantity of the plurality of first converters. For example, the controller may allocate, on average or according to an rule, a corresponding first output voltage threshold to each first converter based on the first voltage and a quantity of first converters in a same string.

The controller adjusts working statuses of the plurality of first converters, so that when the sum of the input voltages of the plurality of first converters in a same string exceeds the first voltage, the controller may limit a total voltage that is output after the plurality of first converters are connected in series to be below the first voltage. In addition to protecting a lower-level device, this increases a maximum quantity of photovoltaic modules that can be connected to a single photovoltaic string, and increases a direct current ratio of the photovoltaic system. In addition, during initial configuration of the photovoltaic system, complex analysis and calculation may not need to be performed based on parameters such as a weather condition and an irradiation temperature in a place in which the photovoltaic system is installed, and only a quantity of photovoltaic modules needs to be connected to the first converter to form the photovoltaic system with the second converter and the inverter. Therefore, an initial design procedure of the photovoltaic system can be greatly simplified.

To ensure that the lower-level second converter or inverter is not damaged, in an embodiment, before each first converter in the photovoltaic system is powered on and establishes normal communication with the controller, the first converter may first control the output voltage to be a low value or may first not output the output voltage, so as to ensure that an input voltage limit value of the lower-level second converter or inverter is not exceeded. In an embodiment, when the sum of the input voltages of the plurality of first converters is not greater than the first voltage and the sum of the input voltages of the plurality of first converters is not less than the second voltage, the input voltages of the plurality of first converters are adjusted by using a maximum power point tracking MPPT method. Based on the method implemented in the photovoltaic system in this patent, after the controller allocates the first output voltage threshold to each first converter, each first converter performs maximum power point tracking or adjusts the output voltage based on an overall requirement of the photovoltaic system. In this way, the lower-level second converter and/or the lower-level inverter can be further protected from being damaged.

The inverter usually includes a power conversion component, and the power conversion component has a loss when performing power conversion. Especially, when the output voltage of the second converter is high, a difference between an input voltage and an output voltage of the inverter is large. The large voltage difference causes a greater loss of the inverter, and the loss causes a temperature rise of the inverter. In an embodiment, the controller is further configured to: obtain a temperature of the inverter, and when the temperature of the inverter is greater than or equal to a first specified temperature, adjust an output voltage of one or more first converters to decrease a sum of voltages output after the plurality of first converters are connected in series. In the foregoing manner, an input voltage of the second converter may be reduced to reduce the output voltage of the second converter, so that the difference between the input voltage and the output voltage of the inverter is reduced, thereby reducing the loss of the inverter and reducing the temperature of the inverter.

The second converter usually also includes a power conversion component, and the power conversion component has a loss when performing power conversion. Especially, when a difference between an input voltage and an output voltage of the second converter is large, the large voltage difference causes a greater loss of the second converter, and the loss causes a temperature rise of the second converter. In an embodiment, the controller is further configured to: obtain a temperature of the second converter, and when the temperature of the second converter is greater than or equal to a second specified temperature, adjust an output voltage of one or more first converters to change a voltage that is output after the plurality of first converters are connected in series, so that the difference between the output voltage and the input voltage of the second converter is reduced, thereby reducing the loss of the second converter and reducing the temperature of the second converter.

In an embodiment, the photovoltaic system further includes a direct current device, where the direct current device is connected to an input end or an output end of the second converter; and the controller is further configured to: when a sum of input voltages of the plurality of first converters is greater than a third voltage, adjust an output voltage of the one or more first converters, so that the sum of the input voltages of the plurality of first converters is less than or equal to the third voltage, where the third voltage is an upper limit value of a voltage allowed to be input to the direct current device. In this manner, when the controller in the photovoltaic system detects that another direct current device is connected, the controller may first obtain a limit value of a voltage allowed to be input to the direct current device, and limit the sum of the output voltages of the plurality of first converters connected in series to each other, so that the sum of the output voltages of the plurality of first converters connected in series to each other is less than or equal to an upper limit value of the voltage allowed to be input to the direct current device.

In an embodiment, the controller in an embodiment of the application may be located in the second converter or the inverter. The controller obtains running data of the plurality of first converters through communication or direct sampling, and sends a corresponding control parameter to the first converter. The controller may further obtain running data of the second converter through communication or direct sampling, and send a corresponding control parameter to the second converter. In an embodiment, communication may be established between the controller and the plurality of first converters or the second converter in a wired transmission or wireless transmission manner.

In an embodiment, the first converter is a buck circuit, and the second converter is a boost circuit.

According to a second aspect, this application provides a control method applied to a photovoltaic system, and the photovoltaic system includes a plurality of first converters, a second converter, an inverter, and a controller. Output ends of a plurality of photovoltaic modules are connected and then connected to an input end of one first converter, output ends of the plurality of first converters are connected in series and then connected to an input end of the second converter, and an output end of the second converter is connected to the inverter. The method includes: obtaining a sum of input voltages of the plurality of first converters connected in series to each other; when the sum of the input voltages of the plurality of first converters is greater than a first voltage, adjusting an output voltage of one or more first converters, so that the sum of the input voltages of the plurality of first converters is less than or equal to the first voltage; and when the sum of the input voltages of the plurality of first converters is less than a second voltage, adjusting an output voltage of the second converter, so that the output voltage of the second converter is greater than or equal to the second voltage, and the plurality of first converters keep in a state of adjusting the input voltages based on power, where the first voltage is greater than the second voltage.

In an embodiment, the inverter is configured to connect a power grid or connect to a load, the first voltage is an upper limit value of a voltage allowed to be input to the inverter, and the second voltage is a peak value of a voltage of the power grid or a minimum value of a voltage required by the load.

In an embodiment, the adjusting an output voltage of one or more first converters includes:
determining, based on the first voltage, a first output voltage threshold corresponding to the plurality of first converters; and
controlling the plurality of first converters, so that output voltages of the plurality of first converters do not exceed the corresponding first output voltage threshold.

In an embodiment, the first output voltage threshold is a product of the input voltage of the first converter and a target threshold voltage, where the target threshold voltage is the first voltage/the sum of the input voltages of the plurality of first converters; or
the first output voltage threshold is the first voltage/N, where N is a total quantity of the plurality of first converters.

In an embodiment, the method further includes:
when a temperature of the inverter is greater than or equal to a first specified temperature, adjusting an output voltage of at least one of the plurality of first converters to decrease a sum of the output voltages of the plurality of first converters.

In an embodiment, the method further includes:
when a temperature of the second converter is greater than or equal to a second specified temperature, adjusting an output voltage of at least one of the plurality of first converters to reduce a difference between the output voltage of the second converter and an input voltage of the second converter.

In an embodiment, the photovoltaic system further includes a direct current device, the direct current device is connected to the input end or the output end of the second converter, and the method further includes:
when the sum of the input voltages of the plurality of first converters is greater than a third voltage, adjusting an output voltage of one or more first converters, so that the sum of the input voltages of the plurality of first converters is less than or equal to the third voltage, where the third voltage is an upper limit value of a voltage allowed to be input to the direct current device.

In an embodiment, the method further includes:
when the sum of the input voltages of the plurality of first converters is not greater than the first voltage and the sum of the input voltages of the plurality of first converters is not less than the second voltage, adjusting the input voltages of the plurality of first converters by using a maximum power point tracking MPPT method.

These aspects or other aspects of this application are more concise and understandable in description of the following embodiments.

DESCRIPTION OF EMBODIMENTS

In the following, some terms in embodiments of this application are first explained and described to facilitate understanding by one of ordinary skilled in the art.

(1) Maximum power point tracking (MPPT): A system detects an input voltage and current in real time to calculate input power, and tracks a maximum input power point based on some preset algorithms. In this way, the system can output more power to a lower level, thereby increasing an energy yield.

(2) Standard test conditions (STC) for a photovoltaic module: The standard test conditions mean the following test conditions: a temperature is 25° C., air mass AM is 1.5, a wind speed is 0 m/s, and light intensity is 1000 W/m$^2$.

In addition, it should be understood that in the descriptions of this application, words such as "first" and "second" are merely used for distinguishing between descriptions, but cannot be understood as an indication or implication of relative importance and cannot be understood as an indication or implication of a sequence. "And/or" describes an association relationship between associated objects, and represents that three relationships may exist. For example, "A and/or B" may represent the following three cases: Only A exists, both A and B exist, and only B exists. The character "/" usually indicates an "or" relationship between associated objects, and "a plurality of" means two or more.

To make the objectives, technical solutions, and advantages of this application clearer, the following further describes this application in detail with reference to the accompanying drawings.

Figure 1A:
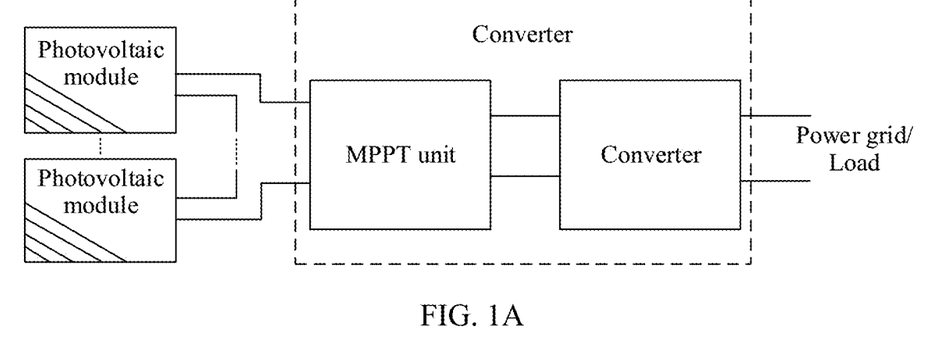
FIG. 1A is a schematic diagram of a structure of an existing photovoltaic system.

Photovoltaic power generation is to convert, by using a converter, a direct current generated by a photovoltaic module into an alternating current that meets a requirement of a power grid and then connect the alternating current to a public power grid or supply power to a load. Refer to FIG. 1A. A conventional photovoltaic system usually includes devices such as a photovoltaic module and a converter. Because an output voltage of a single photovoltaic module is usually low, to enable the photovoltaic system to run well, a plurality of photovoltaic modules are usually first connected in series to form a photovoltaic string, and then the photovoltaic string is connected to the lower-level converter.

An input voltage range of the converter is limited, and therefore a quantity of photovoltaic modules connected in series in a photovoltaic string cannot be excessively large. If an excessively large quantity of photovoltaic modules is connected to the converter, an upper input voltage limit of the converter may be exceeded, and the converter may be damaged. In addition, an open-circuit voltage of the photovoltaic module is related to a running temperature of the photovoltaic module.

A photovoltaic module configuration in the existing photovoltaic system is limited by the upper input voltage limit of the converter. Therefore, logic is complex during configuration of the photovoltaic module, and a quantity of photovoltaic modules that are allowed to be connected to a single photovoltaic string is small, which affects an increase in an energy yield of the photovoltaic system.

Figure 1B:
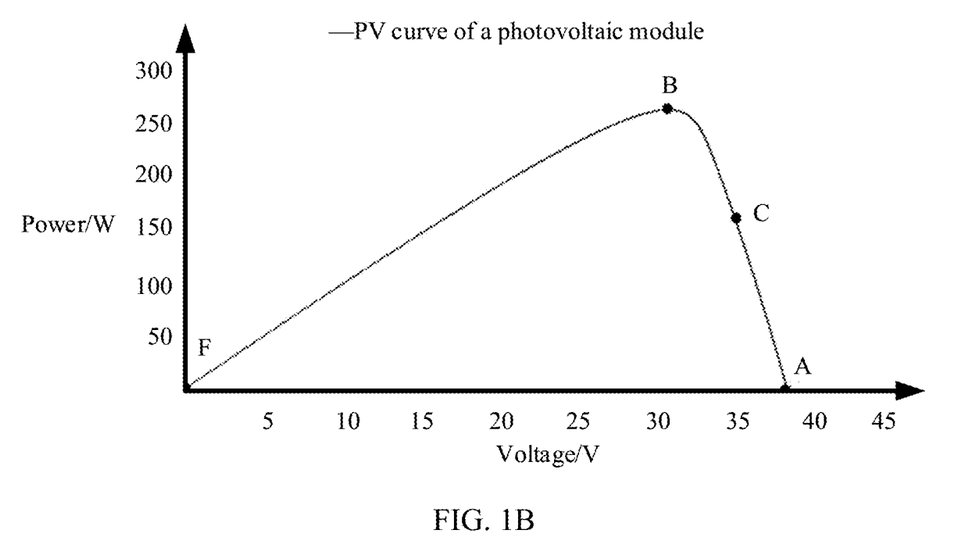
FIG. 1B is a schematic diagram of a P-V curve of a relationship between a voltage and power of a photovoltaic module.
Figure 1C:
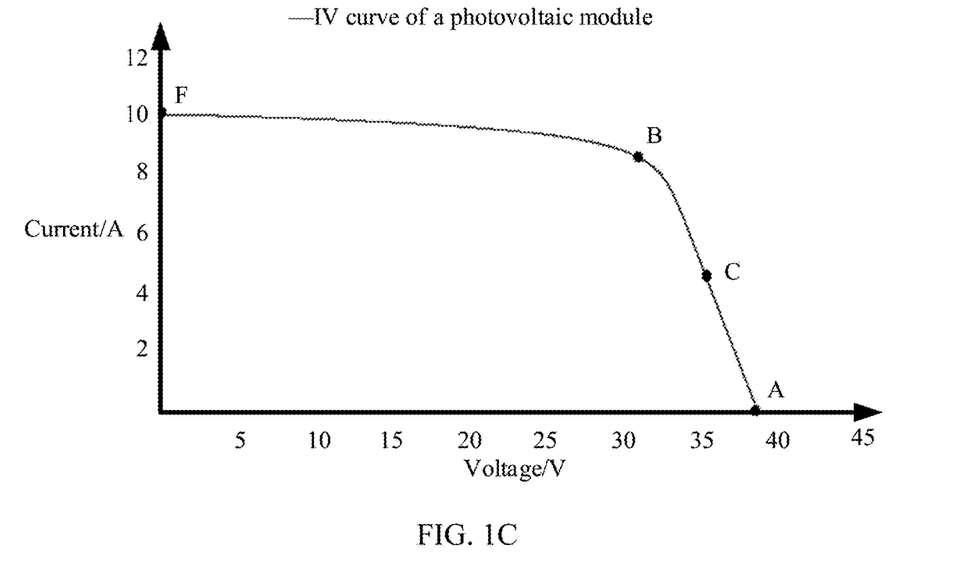
FIG. 1C is a diagram of an I-V curve of a relationship between a current and a voltage of a photovoltaic module.

FIG. 1B is a schematic diagram of a P-V curve of a relationship between a voltage and power of a photovoltaic module, and FIG. 1C is a diagram of an I-V curve of a relationship between a current and a voltage of a photovoltaic module. Refer to FIG. 1B and FIG. 1C. An open-circuit working point of the photovoltaic module is located at a point A, an open-circuit voltage is 38.25 V, a short-circuit working point of the photovoltaic module is located at a point F, a short-circuit current is 9.95 A, and a maximum power point of the photovoltaic module is located at a point B.

Figure 1D:
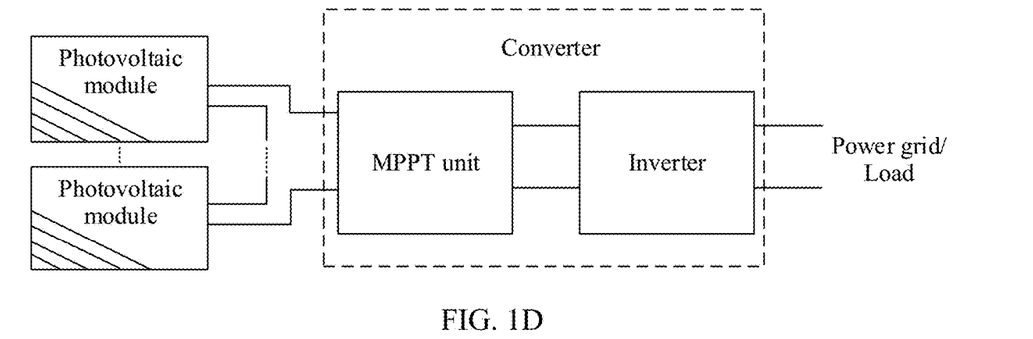
FIG. 1D is a schematic diagram of a structure of a photovoltaic system including an MPPT unit.

FIG. 1D is a schematic diagram of a structure of a photovoltaic system including an MPPT unit. A converter includes the MPPT unit and an inverter, where an input end of the MPPT unit is connected to a plurality of photovoltaic modules, and an output end of the MPPT unit is connected to the inverter. To enable the inverter to work normally, a voltage input to the inverter needs to be greater than a peak value of a voltage of a power grid. When a voltage jointly input by the plurality of photovoltaic modules is less than the peak value of the voltage of the power grid, the MPPT unit may be used to perform boost conversion on the voltage jointly input by the plurality of photovoltaic modules, to ensure normal running of the inverter. In another aspect, the voltage jointly input by the plurality of photovoltaic modules cannot be excessively high, and if the voltage jointly input by the plurality of photovoltaic modules is excessively high, the voltage exceeds a limit value of an input voltage of the MPPT unit or the inverter, which damages the MPPT unit or the inverter.

For example, based on parameters of the photovoltaic module that are defined in FIG. 1B and FIG. 1C, when the limit value of the input voltage of the MPPT unit or the inverter is 600 V and the open-circuit voltage of the photovoltaic module is 38.25 V, a maximum quantity of photovoltaic modules that are allowed to be connected to a single photovoltaic string at a normal temperature is 15 (600 V/38.25 V=15.6).

When the photovoltaic system runs normally at the normal temperature, a working point of each photovoltaic module is between the points A and B in the curves shown in FIG. 1A and FIG. 1B. Therefore, for each photovoltaic string, a working voltage range of the photovoltaic string is 460 V (30.69 V*15=460 V) to 574 V (38.25 V*15=574 V), and an input voltage running range of the MPPT unit or the inverter is 460 V to 574 V. In addition, because only a case in a normal temperature condition is considered for the input voltage running range, and the open-circuit voltage of the photovoltaic module further increases at a low temperature, to ensure that the photovoltaic system can run normally, a quantity of photovoltaic modules connected to each photovoltaic string needs to be further decreased. Therefore, how to flexibly configure a quantity of photovoltaic modules in each photovoltaic string and improve an overall energy yield of a photovoltaic system is an urgent problem to be resolved by one of ordinary skilled in the art.

Figure 2:
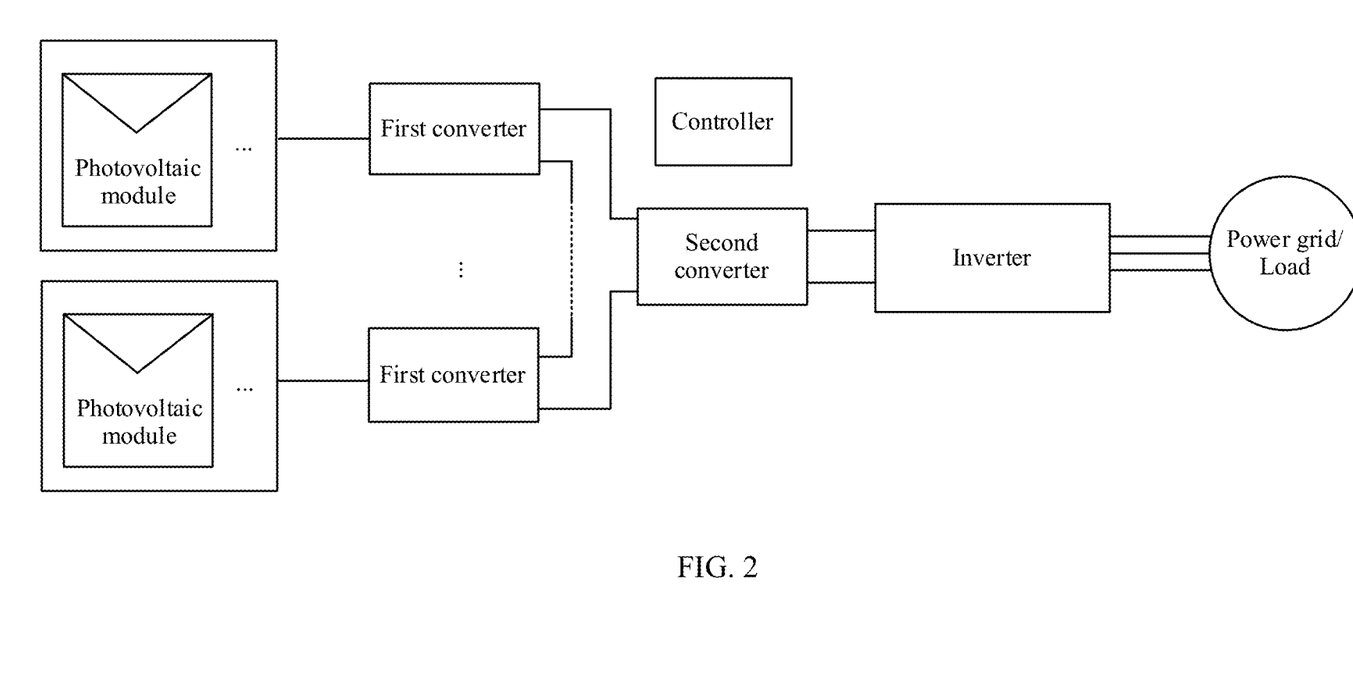
FIG. 2 is a schematic diagram of a structure of a photovoltaic system.

In view of this, embodiments of this application provide a photovoltaic system. FIG. 2 is a schematic diagram of a structure of a photovoltaic system. The photovoltaic system in FIG. 2 includes a plurality of photovoltaic modules, a plurality of first converters, a second converter, an inverter, and a controller. An output end of one or more photovoltaic modules is connected and then connected to an input end of one first converter, and the photovoltaic module is configured to convert absorbed light energy into electric energy.

Output ends of the plurality of first converters are connected in series and then connected to an input end of the second converter, an output end of the second converter is connected to the inverter, and the inverter is configured to convert a direct current into an alternating current and transmit the alternating current to a power grid or a load.

The controller is configured to: obtain a sum of input voltages of the plurality of first converters connected in series to each other; when the sum of the input voltages of the plurality of first converters is greater than a first voltage, adjust an output voltage of one or more first converters, so that the sum of the input voltages of the plurality of first converters is less than or equal to the first voltage; and when the sum of the input voltages of the plurality of first converters is less than a second voltage, adjust an output voltage of the second converter, so that the output voltage of the second converter is greater than or equal to the second voltage, and the plurality of first converters keep in a state of adjusting the input voltages based on power, where the first voltage is greater than the second voltage.

Figure 3:
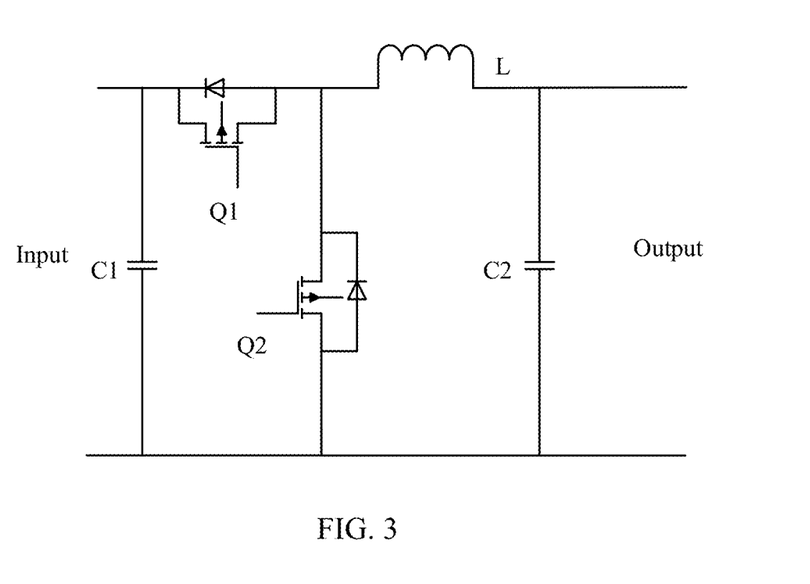
FIG. 3 is a schematic diagram of a structure of a buck circuit.

The first converter may be a buck circuit, and a type of the buck circuit is not limited in embodiments of this application. In an embodiment, the first converter may be a buck circuit. FIG. 3 is a schematic diagram of a structure of a buck circuit. Refer to FIG. 3. The buck circuit includes a first capacitor C1, a first switch Q1, a second switch Q2, an inductor L, and a second capacitor C2. The first switch Q1 is a switch tube, and the second switch Q2 may be a switch tube or may be a diode (that the second switch Q2 is a switch tube is used as an example in FIG. 3). A first end of the first capacitor C1 is connected to a first end of the first switch Q1, a second end of the first switch Q1 is separately connected to a first end of the inductor L and a first end of the second switch Q2, and a third end of the first switch Q1 is configured to input a signal for controlling a status of the first switch Q1. A second end of the second switch Q2 is separately connected to a second end of the first capacitor C1 and a first end of the second capacitor C2, a third end of the second switch Q2 is configured to input a signal for controlling a status of the second switch Q2, and a second end of the inductor L is connected to a second end of the second capacitor C2.

In an embodiment, the controller may be a processor. For example, the controller may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may alternatively be a combination for implementing a computing function. For example, the controller may further include a combination of one or more microprocessors, or a combination of a DSP and a microprocessor. The controller may obtain the sum of the input voltages of the plurality of first converters connected in series to each other, and determine whether the sum of the input voltages of the plurality of first converters connected in series to each other is greater than the first voltage.

A photovoltaic module configuration in the existing photovoltaic system is limited by an upper limit value of a voltage allowed to be input to the inverter. Therefore, in an embodiment, the first voltage is the upper limit value of the voltage allowed to be input to the inverter. The sum of the input voltages of the plurality of first converters is controlled to be less than or equal to the first voltage, so that a quantity of photovoltaic modules connected to the first converter is increased while a lower-level inverter is protected, so that power that is output by the entire photovoltaic system is increased. The first voltage may alternatively be determined based on a parameter of the second converter. For example, the first voltage does not exceed a specified value of the second converter.

Because output voltages (open-circuit voltages) of the photovoltaic module are different at different temperatures, and the output voltage (open-circuit voltage) of the photovoltaic module further increases at a low temperature, to ensure that the photovoltaic system can run normally, a quantity of photovoltaic modules that are allowed to be connected to each photovoltaic string is further decreased, which decreases an overall energy yield of the photovoltaic system. Therefore, in this application, the plurality of first converters connected to the output ends of a plurality of photovoltaic modules are disposed. Therefore, when the sum of the input voltages of the plurality of first converters connected in series to each other is greater than the first voltage, an output voltage of at least one first converter may be adjusted, so that a sum of output voltages of the plurality of first converters is less than the first voltage, thereby ensuring that the photovoltaic system can run normally.

In an embodiment, the controller may be configured to: determine, based on the first voltage, a first output voltage threshold corresponding to the plurality of first converters; and control the plurality of first converters, so that output voltages of the plurality of first converters do not exceed the corresponding first output voltage threshold.

To enable more photovoltaic modules to be connected to the photovoltaic system, and enable a total output voltage range of the plurality of first converters to be independent of a quantity of actually connected photovoltaic modules and a parameter of the photovoltaic module, a possible implementation is as follows.

(1) The controller obtains a target threshold voltage ratio based on a ratio of the first voltage to the sum of the input voltages of the plurality of first converters connected in series to each other. The controller determines the first output voltage threshold based on a product of the input voltage of the first converter and the target threshold voltage ratio, or sets, by using another function relationship, a threshold voltage that is less than or equal to a product of the input voltage of the first converter and a target threshold voltage.

For example, it is assumed that the photovoltaic system defined in the foregoing embodiment is connected to a single-phase power grid, and a voltage of the power grid is 230 V. In an embodiment, the photovoltaic system uses a photovoltaic module having the following working parameters: an open-circuit voltage is 38.25 V, a short-circuit current of the photovoltaic module is 9.95 A, an output voltage of the photovoltaic module is 30.69 V when the photovoltaic module works at a maximum power point, and an output current of the photovoltaic module is 8.48 A when the photovoltaic module works at the maximum power point. When the photovoltaic system requires a large quantity of photovoltaic modules, for example, 20 photovoltaic modules, theoretically, an open-circuit voltage output after the 20 photovoltaic modules are connected in series is 38.25 V*20=765 V. However, an upper limit of an input voltage allowed by a single-phase inverter is usually 600 V, and the open-circuit voltage jointly output by the plurality of photovoltaic modules is far greater than the upper limit of the input voltage allowed by the single-phase inverter.

Based on the architecture defined by the photovoltaic system provided in the foregoing embodiment and the working parameters of the photovoltaic module, it is assumed that an input end of each module is connected to an input end of one first converter, the 20 modules are respectively connected to 20 first converters, and output ends of the 20 first converters are connected in series to form a string. After obtaining a sum (765 V) of input voltages of the plurality of first converters, the controller may determine a target threshold voltage ratio based on a ratio of the first voltage (for example, 550 V) to the sum of the input voltages of the plurality of first converters, where the target threshold voltage ratio is 550 V/765 V=0.72. The controller obtains, based on a product of the input voltage of the first converter and the target threshold voltage ratio, a first output voltage threshold corresponding to each first converter. For example, if an input voltage of a first converter is 38.25 V, a first output voltage threshold corresponding to the first converter is: 38.25 V*0.72=27.5 V. The controller may control an output voltage of each first converter not to exceed the corresponding first output voltage threshold, or each of the plurality of first converters controls an output voltage of the first converter not to exceed the corresponding first output voltage threshold. Therefore, when the photovoltaic system subsequently runs normally, it can be ensured that a voltage obtained by connecting the output voltages of the plurality of first converters connected in series does not exceed 550 V, thereby ensuring that a lower-level device is not damaged.

In addition, in an actual photovoltaic system, output voltages of different photovoltaic modules may be different due to different specifications, different environment temperatures, or different irradiation of the photovoltaic modules, or different shading statuses of the photovoltaic modules. For example, in the 20 photovoltaic modules, there are photovoltaic modules (for example, 10 photovoltaic modules) with an open-circuit voltage of 37 V, and there are also photovoltaic modules (for example, 10 photovoltaic modules) with an open-circuit voltage of 32 V. Assuming that calculation is still performed based on the first voltage of 550 V, the target threshold voltage ratio is 550/(37*10+32*10)–0.797. Therefore, the first output voltage threshold of the first converter that is correspondingly connected to the photovoltaic module with the open-circuit voltage of 37 V is 37 V*0.797=29.5 V, and the first output voltage threshold of the first converter that is correspondingly connected to the photovoltaic module with the open-circuit voltage of 32 V is 32 V*0.797=25.5 V.

(2) The controller obtains, based on the first voltage and a quantity of first converters connected in series to each other, the first output voltage threshold corresponding to the plurality of first converters. For example, the controller may allocate, on average or according to an rule, a first output voltage threshold of each first converter based on the first voltage and a total quantity of the plurality of first converters.

Similarly, based on the architecture defined by the photovoltaic system provided in the foregoing embodiment and the working parameters of the photovoltaic module, after determining a quantity (20) of first converters in a same serial string, the controller may determine a plurality of first output voltage thresholds based on the first voltage (550 V) and the total quantity of first converters. For example, the first voltage is evenly allocated based on the total quantity of first converters, and a first output voltage threshold of a first converter that is correspondingly connected to each photovoltaic module is set to 550 V/20=27.5 V, so that an output voltage obtained after the plurality of first converters are connected in series is less than or equal to the first voltage. Therefore, when the photovoltaic system subsequently runs normally, the controller controls an output voltage of the first converter not to exceed the corresponding first output voltage threshold.

In conclusion, the controller limits the output voltages of the plurality of first converters, so that when a total input voltage of the plurality of first converters connected in series to each other exceeds the first voltage, the controller may control the plurality of first converters to control the sum of the voltages output after the plurality of first converters are connected in series to be below the first voltage, so that a maximum quantity of photovoltaic modules that can be connected to a single photovoltaic string is increased, and a direct current ratio of the photovoltaic system is increased. In addition, during initial configuration of the photovoltaic system, complex analysis and calculation may not need to be performed based on parameters such as a weather condition and an irradiation temperature during installation of the photovoltaic system, and only a quantity of photovoltaic modules needs to be connected to the first converter to form the photovoltaic system. Therefore, an initial design procedure of the photovoltaic system can be greatly simplified.

To ensure that the lower-level second converter or inverter is not damaged, in an embodiment, before each first converter in the photovoltaic system is powered on and establishes normal communication with the controller, the first converter may first control the output voltage to be a low value or may first not output the output voltage, so as to ensure that an input voltage limit value of the lower-level second converter or inverter is not exceeded. Then, after the first converter establishes communication with the controller, based on the foregoing implementation of this application, after the controller allocates the first output voltage threshold to each first converter, the first converter performs maximum power point tracking or outputs a voltage based on an overall requirement of the photovoltaic system. In this way, the lower-level second converter or inverter can be further protected from being damaged.

The inverter usually includes a power conversion component, and the power conversion component has a loss when performing power conversion. Especially, when the output voltage of the second converter is high, a difference between an input voltage and an output voltage of the inverter is large. The large voltage difference causes a greater loss of the inverter, and the loss causes a temperature rise of the inverter. In an embodiment, the controller is further configured to: obtain a temperature of the inverter, and when the temperature of the inverter is greater than a first specified temperature, adjust an output voltage of one or more first converters to decrease a sum of voltages output after the plurality of first converters are connected in series. In the foregoing manner, an input voltage of the second converter may be reduced to reduce the output voltage of the second converter, so that the difference between the input voltage and the output voltage of the inverter is reduced, thereby reducing the loss of the inverter and reducing the temperature of the inverter. It should be noted that the temperature of the inverter in the photovoltaic system in this application may be a surface temperature of the inverter, or may be a temperature of a switching component inside the inverter. This is not limited in this application.

In the photovoltaic system, the inverter is configured to connect a power grid or connect to a load. To enable the inverter to work normally, a voltage input to the inverter needs to be greater than a peak value of a voltage of the power grid or a minimum value of a voltage required by the load. In an embodiment, when the sum of the input voltages of the plurality of first converters is less than the second voltage, the controller adjusts the output voltage of the second converter, so that the output voltage of the second converter is greater than or equal to the second voltage.

Figure 4:
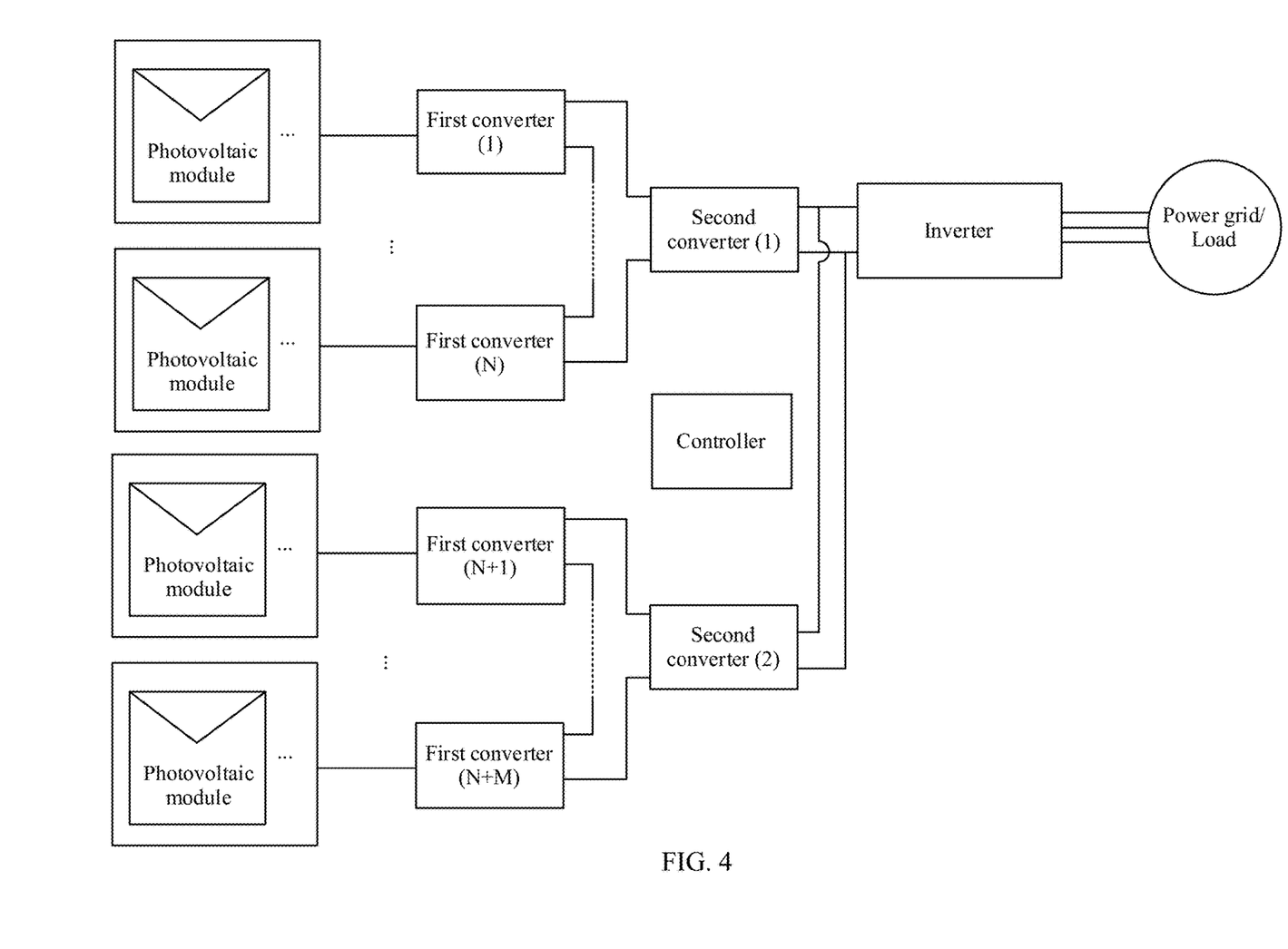
FIG. 4 is a schematic diagram of an architecture of another photovoltaic system.

In addition, FIG. 4 is a schematic diagram of an architecture of another photovoltaic system. Refer to FIG. 4. A plurality of photovoltaic modules in the photovoltaic system in this application may be divided into a plurality of groups. In an actual scenario, due to an environment problem or different irradiation or shielding situations, output voltages of photovoltaic modules in the groups may be different at an initial power-on moment of the photovoltaic system. For example, the plurality of photovoltaic modules are divided into two groups (20 photovoltaic modules and 22 photovoltaic modules), where an output voltage of each of the 20 photovoltaic modules is 37 V, and an output voltage of each of the 22 photovoltaic modules is 35 V. The controller may determine, based on the first voltage and a sum of input voltages of the plurality of first converters connected in series to each other or a total quantity of first converters connected in series to each other, a first output voltage threshold corresponding to the first converter, so that a sum of output voltages of the plurality of first converters in each group does not exceed the first voltage, thereby ensuring that a component in a lower-level inverter is not damaged.

Figure 5A:
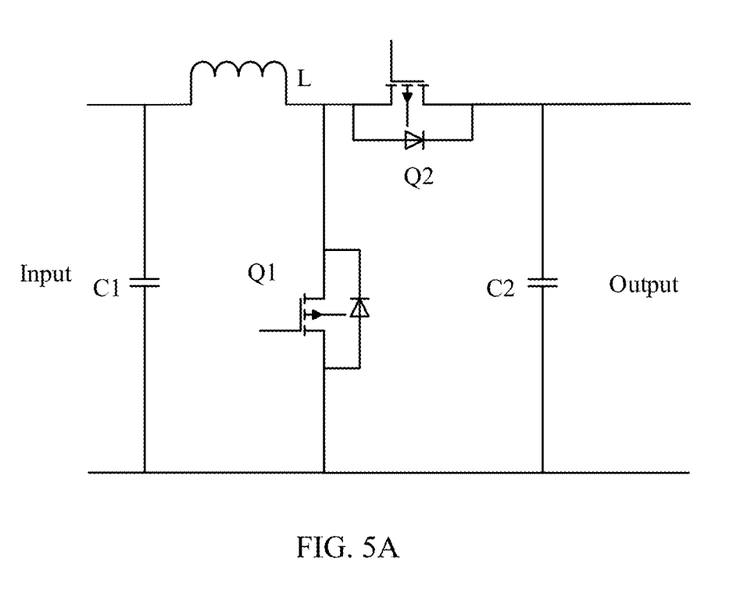
FIG. 5A is a schematic diagram of a boost circuit.

In an embodiment, the second converter is a boost circuit. In an embodiment, the second converter may alternatively be a three-level boost circuit. FIG. 5A is a schematic diagram of a boost circuit. The boost circuit includes a first capacitor C1, an inductor L, a first switch Q1, a second switch Q2, and a second capacitor C2. The first switch Q1 is a switch tube, and the second switch Q2 may be a switch tube or may be a diode (that the second switch Q2 is a switch tube is used as an example in FIG. 5A). A first end of the first capacitor C1 is connected to a first end of the inductor L, a second end of the inductor L is separately connected to a first end of the first switch Q1 and a first end of the second switch Q2, a second end of the first capacitor C1 is separately connected to a second end of the first switch Q1 and a second end of the second capacitor C2, and the second end of the second switch Q2 is connected to a first end of the second capacitor C2. A third end of the first switch Q1 is configured to input a signal for controlling a status of the second switch Q2, and a third end of the second switch Q2 is configured to input a signal for controlling a status of the second switch Q2.

The second converter usually also includes a power conversion component, and the power conversion component has a loss when performing power conversion. Especially, when a difference between an input voltage and an output voltage of the second converter is large, the large voltage difference causes a greater loss of the second converter, and the loss causes a temperature rise of the second converter. In an embodiment, the controller is further configured to: obtain a temperature of the second converter, and when the temperature of the second converter is greater than or equal to a second specified temperature, adjust an output voltage of one or more first converters to change a voltage that is output after the plurality of first converters are connected in series, so that the difference between the output voltage and the input voltage of the second converter is reduced, thereby reducing the loss of the second converter and reducing the temperature of the second converter. In this application, the temperature of the second converter may be a surface temperature of the second converter, or may be a temperature of a power component inside the second converter. This is not limited in this application.

Figure 5B:
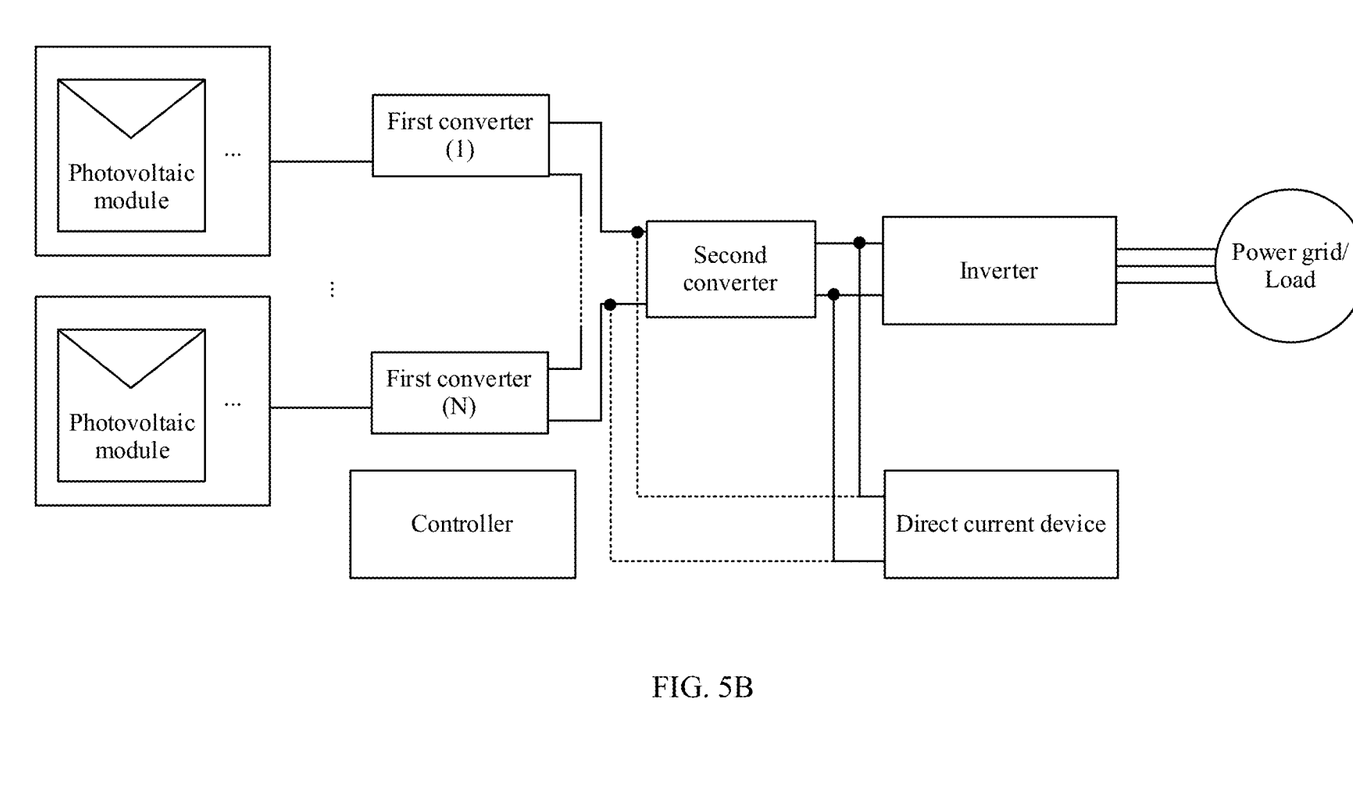
FIG. 5B is a schematic diagram of a photovoltaic system including a direct current device.

FIG. 5B is a schematic diagram of a photovoltaic system including a direct current device. Refer to FIG. 5B. In the photovoltaic system provided in an embodiment of the application, the photovoltaic system further includes a direct current device, and the direct current device is connected to the input end or the output end of the second converter. The controller is further configured to: when the sum of the input voltages of the plurality of first converters is greater than a third voltage, adjust an output voltage of one or more first converters, so that the sum of the input voltages of the plurality of first converters is less than or equal to the third voltage, where the third voltage is an upper limit value of a voltage allowed to be input to the direct current device. In an embodiment, the controller may allocate, based on the third voltage, a corresponding second output voltage threshold to the plurality of first converters. The controller controls the plurality of first converters, so that the output voltages of the plurality of first converters do not exceed the corresponding second output voltage threshold. Therefore, an adjusted output voltage of any first converter is less than or equal to the second output voltage threshold corresponding to the first converter. In this manner, when the controller in the photovoltaic system detects that another direct current device is connected, the controller may first obtain a limit value of a voltage allowed to be input to the direct current device, and limit, based on the limit value of the voltage allowed to be input to the direct current device, the sum of the output voltages of the plurality of first converters connected in series to each other, so that the sum of the output voltages of the plurality of first converters in a same string is less than or equal to the limit value of the voltage allowed to be input to the connected direct current device.

In an embodiment, the direct current device may be an energy storage device, an electric vehicle charging device, or another direct current source or load device. For the foregoing type of direct current device, for example, the energy storage device or the electric vehicle charging device, a voltage range in which the foregoing device can run may be different from that of a common inverter. For example, when the controller in the photovoltaic system detects that another direct current device is connected, the controller may first obtain an upper limit value of a voltage allowed to be input to the direct current device; and when an input voltage limit value specified by the direct current device is less than the upper limit value of the voltage allowed to be input to the direct current device, the controller allocates, based on the limit value of the voltage allowed to be input to the direct current device, a corresponding second output voltage threshold to the plurality of first converters. The controller controls the plurality of first converters, so that the output voltages of the plurality of first converters do not exceed the corresponding second output voltage threshold. In this manner, a voltage of a connection connect point of the direct current device may be controlled in a proper range, so that the photovoltaic system can adapt to the newly connected direct current device.

In an embodiment, in an embodiment of the application, the controller may be located in the second converter or the inverter. The controller obtains running data of the plurality of first converters through communication or direct sampling, and sends a corresponding control parameter to the first converter. The controller may further obtain running data of the second converter through communication or direct sampling, and send a corresponding control parameter to the second converter. In an embodiment, the controller may establish communication with the plurality of first converters in a wired transmission or wireless transmission manner. For example, wired transmission may include a wired local area network (LAN), a serial bus, a controller area network (CAN), and a power line communication (PLC). Wireless transmission may include 6G\5G\4G\3G\2G, a general packet radio service (GPRS), a wireless network (Wi-Fi), Bluetooth, ZigBee, infrared, and the like.

The plurality of first converters and the second converter each usually also include a power conversion component, and the power conversion component usually has a loss when performing power conversion. In addition, for the power conversion component, when a difference between an input voltage and an output voltage of the power conversion component is large, a loss of the power conversion component also increases. Therefore, after the controller allocates an output upper threshold voltage to the plurality of first converters, the controller may further control the plurality of first converters and the second converter to be at a working point with a low loss. To enable the first converter to work at a working point with a low loss, the output voltage of the first converter needs to be increased as much as possible, for example, a ratio of the output voltage to the input voltage of the first converter is controlled from 0.8 to 1. However, to enable the second converter to work at a working point with a low loss, the output voltage of the second converter may be controlled to be as low as possible, for example, a ratio of the output voltage to the input voltage of the second converter is controlled from 1 to 1.25, so as to maximize working efficiency of the plurality of first converters and the second converter in the photovoltaic system.

For example, this application provides an instance of controlling a photovoltaic system, and the controller in the photovoltaic system may perform the following operations, so that an overall energy yield of the photovoltaic system can be increased while it is ensured that a component in a lower-level inverter is not damaged.

Figure 6A:
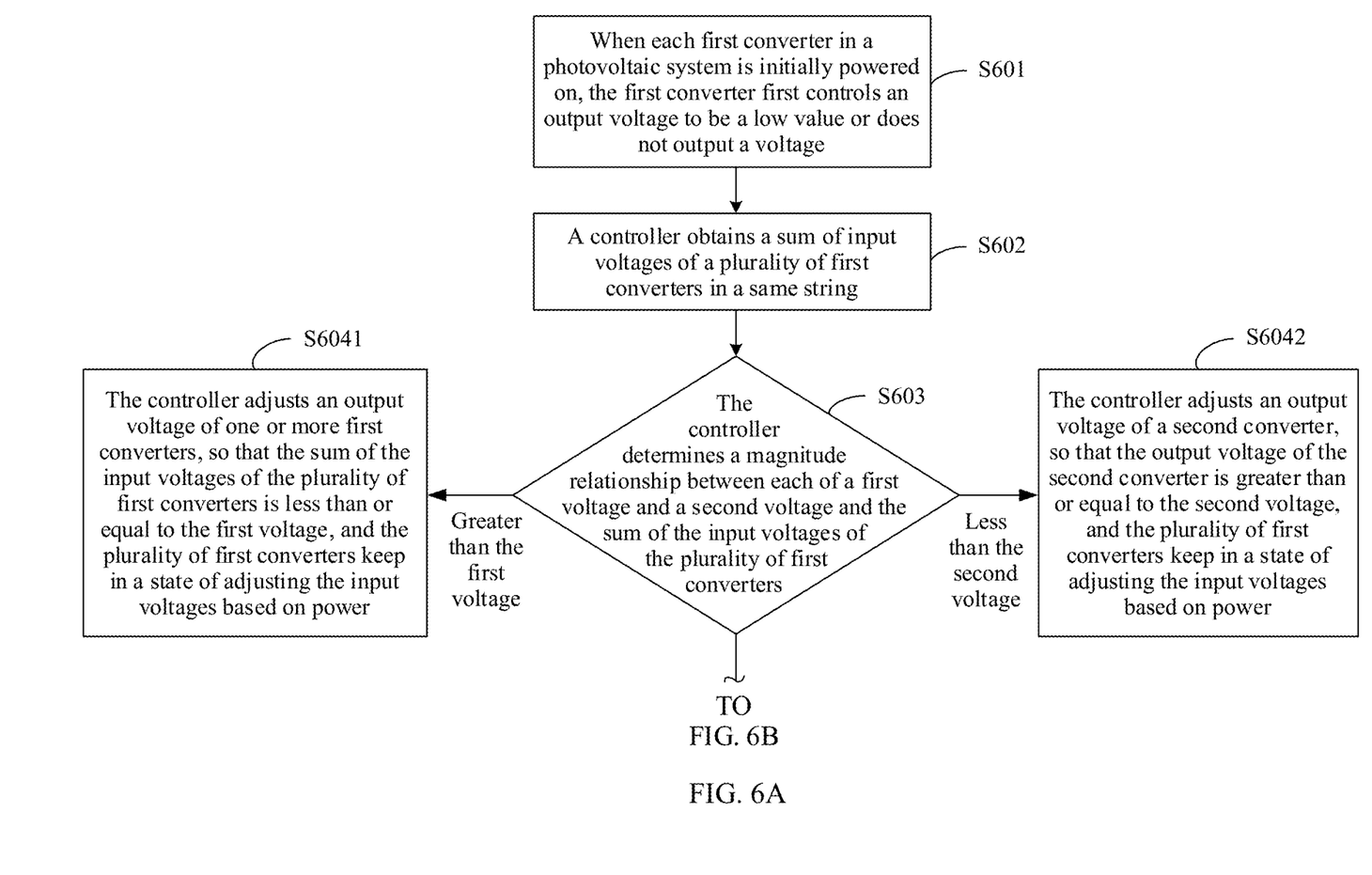
FIG. 6A and FIG. 6B are a schematic diagram of a procedure for controlling a photovoltaic system.
Figure 6B:
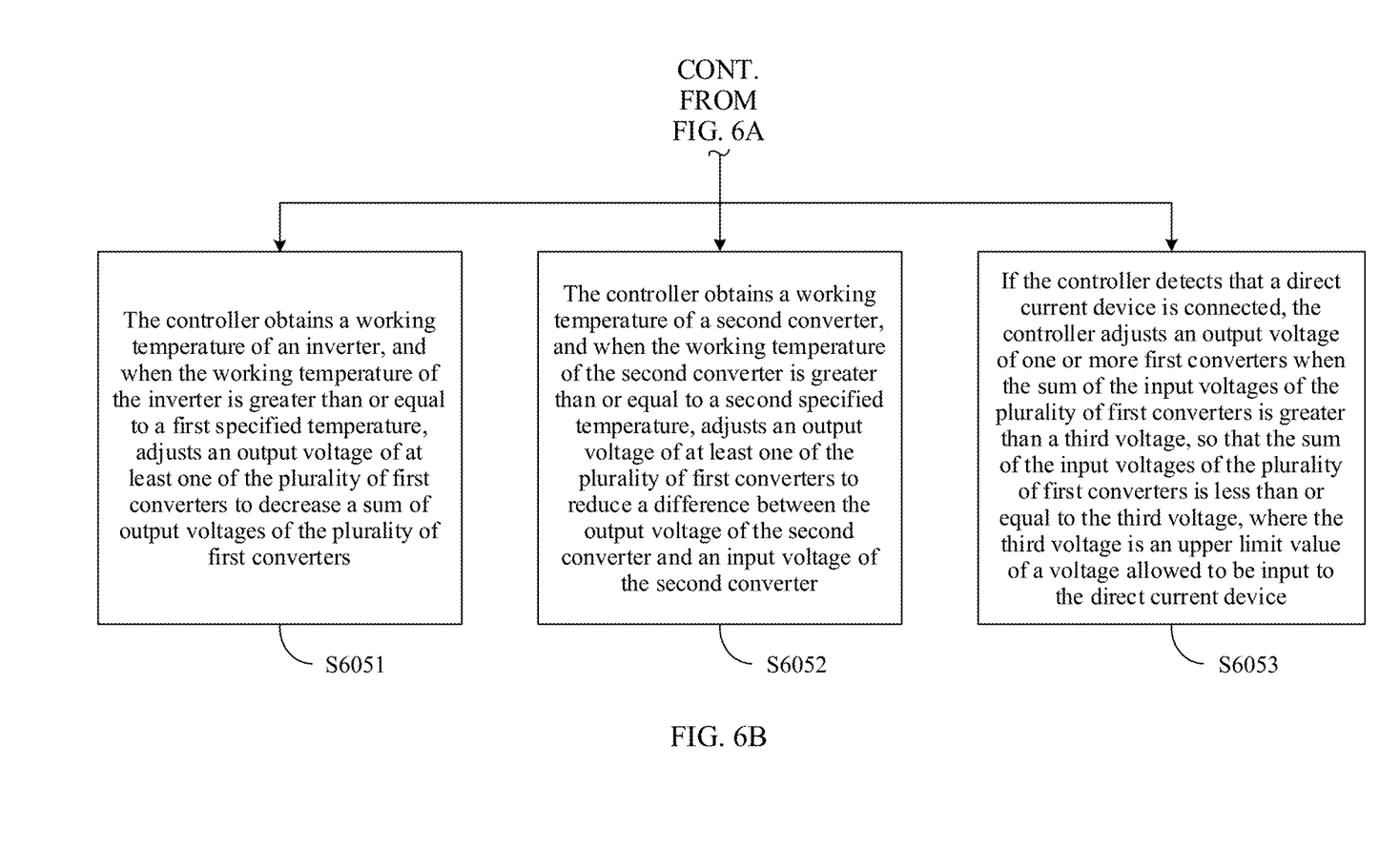

FIG. 6A and FIG. 6B are a schematic diagram of a procedure for controlling a photovoltaic system. Refer to FIG. 6A and FIG. 6B. The procedure includes the following operations.

Operation S601: When each first converter in the photovoltaic system is initially powered on, the first converter first controls an output voltage to be a low value or does not output a voltage.

Operation S602: The controller obtains a sum of input voltages of a plurality of first converters in a same string.

Operation S603: The controller determines a magnitude relationship between each of a first voltage and a second voltage and the sum of the input voltages of the plurality of first converters, where the first voltage is an upper limit value of a voltage allowed to be input to the inverter, and the second voltage is a peak value of a voltage of the power grid or a minimum value of a voltage required by the load; and performs operation S6041 when the sum of the input voltages of the plurality of first converters is greater than the first voltage; and performs operation S6042 when the sum of the input voltages of the plurality of first converters is less than the second voltage.

Operation S6041: The controller adjusts an output voltage of one or more first converters, so that the sum of the input voltages of the plurality of first converters is less than or equal to the first voltage, and the plurality of first converters keep in a state of adjusting the input voltages based on power.

Operation S6042: The controller adjusts an output voltage of a second converter, so that the output voltage of the second converter is greater than or equal to the second voltage, and the plurality of first converters keep in a state of adjusting the input voltages based on power.

Operation S6051: The controller obtains a working temperature of the inverter, and when the working temperature of the inverter is greater than or equal to a first specified temperature, adjusts an output voltage of at least one of the plurality of first converters to decrease a sum of output voltages of the plurality of first converters.

Operation S6052: The controller obtains a working temperature of the second converter, and when the working temperature of the second converter is greater than or equal to a second specified temperature, adjusts an output voltage of at least one of the plurality of first converters to reduce a difference between the output voltage of the second converter and an input voltage of the second converter.

Operation S6053: If the controller detects that a direct current device is connected, the controller adjusts an output voltage of one or more first converters when the sum of the input voltages of the plurality of first converters is greater than a third voltage, so that the sum of the input voltages of the plurality of first converters is less than or equal to the third voltage, where the third voltage is an upper limit value of a voltage allowed to be input to the direct current device.

This application provides a control method applied to a photovoltaic system, and the photovoltaic system includes a plurality of first converters, a second converter, an inverter, and a controller. Output ends of a plurality of photovoltaic modules are connected and then connected to an input end of one first converter, output ends of the plurality of first converters are connected in series and then connected to an input end of the second converter, and an output end of the second converter is connected to the inverter. The method includes: obtaining a sum of input voltages of the plurality of first converters connected in series to each other; when the sum of the input voltages of the plurality of first converters is greater than a first voltage, adjusting an output voltage of one or more first converters, so that the sum of the input voltages of the plurality of first converters is less than or equal to the first voltage; and when the sum of the input voltages of the plurality of first converters is less than a second voltage, adjusting an output voltage of the second converter, so that the output voltage of the second converter is greater than or equal to the second voltage, and the plurality of first converters keep in a state of adjusting the input voltages based on power, where the first voltage is greater than the second voltage.

In an embodiment, the inverter is configured to connect a power grid or connect to a load, the first voltage is an upper limit value of a voltage allowed to be input to the inverter, and the second voltage is a peak value of a voltage of the power grid or a minimum value of a voltage required by the load.

In an embodiment, the adjusting an output voltage of one or more first converters includes: determining, based on the first voltage, a first output voltage threshold corresponding to the plurality of first converters; and controlling the plurality of first converters, so that output voltages of the plurality of first converters do not exceed the corresponding first output voltage threshold.

In an embodiment, the first output voltage threshold is a product of the input voltage of the first converter and a target threshold voltage, where the target threshold voltage is the first voltage/the sum of the input voltages of the plurality of first converters; or the first output voltage threshold is the first voltage/N, where N is a total quantity of the plurality of first converters.

In an embodiment, the method further includes: when a temperature of the inverter is greater than or equal to a first specified temperature, adjusting an output voltage of at least one of the plurality of first converters to decrease a sum of the output voltages of the plurality of first converters.

In an embodiment, the method further includes: when a temperature of the second converter is greater than or equal to a second specified temperature, adjusting an output voltage of at least one of the plurality of first converters to reduce a difference between the output voltage of the second converter and an input voltage of the second converter.

In an embodiment, the photovoltaic system further includes a direct current device, and the direct current device is connected to the input end or the output end of the second converter. The method further includes: when the sum of the input voltages of the plurality of first converters is greater than a third voltage, adjusting an output voltage of one or more first converters, so that the sum of the input voltages of the plurality of first converters is less than or equal to the third voltage, where the third voltage is an upper limit value of a voltage allowed to be input to the direct current device.

In an embodiment, the method further includes: when the sum of the input voltages of the plurality of first converters is not greater than the first voltage and the sum of the input voltages of the plurality of first converters is not less than the second voltage, adjusting the input voltages of the plurality of first converters by using a maximum power point tracking MPPT method.

One or ordinary skilled in the art should understand that embodiments of this application may be provided as a method, a system, or a computer program product. Therefore, this application may use a form of a hardware only embodiment, a software only embodiment, or an embodiment combining software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a function in one or more procedures in the flowcharts and/or in one or more blocks in the block diagrams.

These computer program instructions may be stored in a computer-readable memory that can instruct a computer or another programmable data processing device to work in a manner, so that the instructions stored in the computer-readable memory generate an artifact that includes an instruction apparatus. The instruction apparatus implements a function in one or more procedures in the flowcharts and/or in one or more blocks in the block diagrams.

These computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide operations for implementing a function in one or more procedures in the flowcharts and/or in one or more blocks in the block diagrams.

Apparently, one or ordinary skilled in the art can make various modifications and variations to this application without departing from the protection scope of this application. This application is intended to cover these modifications and variations of this application provided that they fall within the scope of the claims of this application and an equivalent technology thereof.

What is claimed is:

1. A photovoltaic system, comprising:
    a plurality of first converters, wherein an input end of at least one of the first converters is coupled to output ends of a plurality of photovoltaic modules,
    a second converter, wherein output ends of the plurality of first converters are connected in series and then connected to an input end of the second converter, and
    an inverter, wherein an output end of the second converter is connected to the inverter;
    a controller configured to:
    obtain a sum of input voltages of the plurality of first converters connected in series to each other; and
    when the sum of the input voltages of the plurality of first converters is greater than a first voltage, adjust an output voltage of one or more first converters, so that the sum of the input voltages of the plurality of first converters is less than or equal to the first voltage; and
    when the sum of the input voltages of the plurality of first converters is less than a second voltage, adjust an output voltage of the second converter, so that the output voltage of the second converter is greater than or equal to the second voltage, and the plurality of first converters keep in a state of adjusting the input voltages based on power, wherein the first voltage is greater than the second voltage.

2. The photovoltaic system according to claim 1, wherein the inverter is configured to connect a power grid or connect to a load, the first voltage is an upper limit value of a voltage allowed to be input to the inverter, and the second voltage is a peak value of a voltage of the power grid or a minimum value of a voltage required by the load.

3. The photovoltaic system according to claim 1, wherein the controller is configured to:
    determine, based on the first voltage, a first output voltage threshold corresponding to the plurality of first converters; and
    control the plurality of first converters, so that output voltages of the plurality of first converters do not exceed the corresponding first output voltage threshold.

4. The photovoltaic system according to claim 3, wherein the first output voltage threshold is a product of an input voltage of the first converter and a target threshold voltage, and the target threshold voltage is the first voltage divided by the sum of the input voltages of the plurality of first converters; or
    the first output voltage threshold is the first voltage divided by N, wherein N is a total quantity of the plurality of first converters.

5. The photovoltaic system according to claim 1, wherein the controller is further configured to:
    when a temperature of the inverter is greater than or equal to a first specified temperature, adjust an output voltage of at least one of the plurality of first converters to decrease a sum of the output voltages of the plurality of first converters.

6. The photovoltaic system according to claim 1, wherein the controller is further configured to:
when a temperature of the second converter is greater than or equal to a second specified temperature, adjust an output voltage of at least one of the plurality of first converters to reduce a difference between the output voltage of the second converter and an input voltage of the second converter.

7. The photovoltaic system according to claim 1, further comprising:
a direct current device connected to the input end or the output end of the second converter, wherein the controller is further configured to:
when the sum of the input voltages of the plurality of first converters is greater than a third voltage, adjust an output voltage of one or more first converters, so that the sum of the input voltages of the plurality of first converters is less than or equal to the third voltage, wherein the third voltage is an upper limit value of a voltage allowed to be input to the direct current device.

8. The photovoltaic system according to claim 1, wherein the first converter is a buck circuit.

9. The photovoltaic system according to claim 1, wherein the second converter is a boost circuit.

10. The photovoltaic system according to claim 1, wherein the controller is further configured to:
when the sum of the input voltages of the plurality of first converters is not greater than the first voltage and the sum of the input voltages of the plurality of first converters is not less than the second voltage, adjust the input voltages of the plurality of first converters by using a maximum power point tracking MPPT method.

11. A control method, performed by a photovoltaic system that comprises a plurality of first converters, a second converter, an inverter, and a controller, and the method comprises:
obtaining a sum of input voltages of the plurality of first converters connected in series to each other, wherein an input end of at least one of the first converters is coupled to output ends of a plurality of photovoltaic modules, output ends of the plurality of first converters are connected in series and then connected to an input end of the second converter, and an output end of the second converter is connected to the inverter; and
when the sum of the input voltages of the plurality of first converters is greater than a first voltage, adjusting an output voltage of one or more first converters, so that the sum of the input voltages of the plurality of first converters is less than or equal to the first voltage; and
when the sum of the input voltages of the plurality of first converters is less than a second voltage, adjusting an output voltage of the second converter, so that the output voltage of the second converter is greater than or equal to the second voltage, and the plurality of first converters keep in a state of adjusting the input voltages based on power, wherein the first voltage is greater than the second voltage.

12. The method according to claim 11, wherein the inverter is configured to connect a power grid or connect to a load, the first voltage is an upper limit value of a voltage allowed to be input to the inverter, and the second voltage is a peak value of a voltage of the power grid or a minimum value of a voltage required by the load.

13. The method according to claim 11, wherein the adjusting the output voltage of the one or more first converters comprises:
determining, based on the first voltage, a first output voltage threshold corresponding to the plurality of first converters; and
controlling the plurality of first converters, so that output voltages of the plurality of first converters do not exceed the corresponding first output voltage threshold.

14. The method according to claim 13, wherein the first output voltage threshold is a product of an input voltage of the first converter and a target threshold voltage ratio, and the target threshold voltage is the first voltage divided by the sum of the input voltages of the plurality of first converters; or
the first output voltage threshold is the first voltage divided by N, wherein N is a total quantity of the plurality of first converters.

15. The method according to claim 11, further comprising:
when a temperature of the inverter is greater than or equal to a first specified temperature, adjusting an output voltage of at least one of the plurality of first converters to decrease a sum of the output voltages of the plurality of first converters.

16. The method according to claim 11, further comprising:
when a temperature of the second converter is greater than or equal to a second specified temperature, adjusting an output voltage of at least one of the plurality of first converters to reduce a difference between the output voltage of the second converter and an input voltage of the second converter.

17. The method according to claim 11, wherein the photovoltaic system further comprises a direct current device connected to the input end or the output end of the second converter, and the method further comprises:
when the sum of the input voltages of the plurality of first converters is greater than a third voltage, adjusting an output voltage of one or more first converters, so that the sum of the input voltages of the plurality of first converters is less than or equal to the third voltage, wherein the third voltage is an upper limit value of a voltage allowed to be input to the direct current device.

18. The method according to claim 11, wherein the first converter is a buck circuit.

19. The method according to claim 11, wherein the second converter is a boost circuit.

20. The method according to claim 11, further comprising:
when the sum of the input voltages of the plurality of first converters is not greater than the first voltage and the sum of the input voltages of the plurality of first converters is not less than the second voltage, adjusting the input voltages of the plurality of first converters by using a maximum power point tracking MPPT method.

* * * * *